United States Patent
Agarwal et al.

(10) Patent No.: US 11,201,843 B1
(45) Date of Patent: Dec. 14, 2021

(54) DYNAMIC MIGRATION OF CONVERSATIONS BETWEEN COMMUNICATION PLATFORMS

(71) Applicant: International Business Machines Corporation, Armonk, NY (US)

(72) Inventors: Pranab Agarwal, Oxenford (AU); Narayana Aditya Madineni, Southport (AU); Chia-Le Cheng, Southport (AU); Shane Nicholas Cress, Wendouree (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/168,216

(22) Filed: Feb. 5, 2021

(51) Int. Cl.
*G06F 15/16* (2006.01)
*H04L 12/58* (2006.01)

(52) U.S. Cl.
CPC ............ *H04L 51/16* (2013.01); *H04L 51/066* (2013.01); *H04L 51/12* (2013.01); *H04L 51/22* (2013.01); *H04L 51/26* (2013.01); *H04L 51/36* (2013.01)

(58) Field of Classification Search
CPC ....... H04L 51/16; H04L 51/066; H04L 51/36; H04L 51/26; H04L 51/22; H04L 51/12
USPC .................................. 709/204, 205, 206, 207
See application file for complete search history.

(56) References Cited

U.S. PATENT DOCUMENTS

| | | | | |
|---|---|---|---|---|
| 7,472,351 B1* | 12/2008 | Zilka | ..................... | G06Q 10/107 709/206 |
| 2005/0132012 A1* | 6/2005 | Muller | .................. | H04L 51/066 709/206 |
| 2006/0085502 A1 | 4/2006 | Sundararajan | | |
| 2007/0124405 A1* | 5/2007 | Ulmer | ..................... | H04L 51/04 709/207 |
| 2008/0208984 A1 | 8/2008 | Rosenberg | | |
| 2010/0312836 A1 | 12/2010 | Serr | | |
| 2011/0161438 A1* | 6/2011 | Bhogal | ................ | G06Q 10/107 709/206 |
| 2013/0031185 A1 | 1/2013 | Wyatt | | |
| 2013/0204949 A1* | 8/2013 | Elleouet | .................. | H04L 51/04 709/206 |
| 2016/0173616 A1* | 6/2016 | Bank | ....................... | H04L 51/22 709/227 |
| 2016/0294759 A1 | 10/2016 | Huang | | |

(Continued)

OTHER PUBLICATIONS

"Method of Defining Threshold Parameters for an email thread to Determine Appropriate Follow Up Action to Continue a Communication on Exceeding the Threshold", An IP.com Prior Art Database Technical Disclosure, Authors et. al.: Disclosed Anonymously, IP.com No. IPCOM000213890D, IP.com Electronic Publication Date: Jan. 4, 2012, 4 pages.

(Continued)

*Primary Examiner* — Johnny B Aguiar
(74) *Attorney, Agent, or Firm* — Aaron N. Pontikos

(57) ABSTRACT

A computer-implemented method for dynamically migrating an email thread from an email platform to a message thread on messaging platform includes: monitoring an ongoing email thread; and migrating the email thread from an email platform to a messaging platform in response to an attribute associated with the email thread reaching and/or exceeding a predetermined threshold level, wherein migrating the email thread includes converting the contents of the email thread into one or more message threads on the messaging platform.

18 Claims, 9 Drawing Sheets

(56) References Cited

U.S. PATENT DOCUMENTS

| | | | | |
|---|---|---|---|---|
| 2016/0323235 | A1 | 11/2016 | Lindsay | |
| 2018/0025076 | A1* | 1/2018 | Bastide | H04L 51/32 |
| | | | | 707/728 |
| 2018/0351901 | A1* | 12/2018 | Snider | G06N 20/20 |
| 2019/0007362 | A1* | 1/2019 | Shmunis | H04L 51/36 |

OTHER PUBLICATIONS

"System and method of integrating email and instant messenger system", An IP.com Prior Art Database Technical Disclosure, Authors et. al.: Disclosed Anonymously, IP.com No. IPCOM000246921D, IP.com Electronic Publication Date: Jul. 15, 2016, 6 pages.

Mell et al., "The NIST Definition of Cloud Computing", Recommendations of the National Institute of Standards and Technology, NIST Special Publication 800-145, Sep. 2011, 7 pages.

\* cited by examiner

DYNAMIC MIGRATION OF CONVERSATIONS BETWEEN COMMUNICATION PLATFORMS

BACKGROUND

The present invention relates generally to the field of electronic communications, and more particularly to dynamically migrating conversations between communication platforms.

Both asynchronous and synchronous communication allow users to converse more quickly and easily through the exchange of messages in real-time. Synchronous communication, such as online chat platforms, are typically used for one-time conversations, oftentimes between customer service representatives and customers, for the purpose of answering questions, getting support or making purchase decisions. With synchronous communication, both parties have to be available at the same time to communicate. For example, if one party leaves the chat session or does not answer fast enough, the chat session ends, and any communications generated during the chat session are not maintained.

Asynchronous communication, such as electronic mail (i.e., email or e-mail), short message service (SMS), and application based messaging allow for the asynchronous exchange of messages in real-time, in which any party to a message can respond immediately, in a few hours, in a few weeks, or even years later. Accordingly, neither the users nor their devices are required to be online simultaneously to send or receive messages. Rather, only a single party needs to obtain a network connection in order to send, receive, or download messages. Additionally, with most asynchronous communication platforms, the conversation history is maintained over the duration of the conversation.

SUMMARY

According to one embodiment of the present invention, a computer-implemented method for dynamically migrating an email thread from an email platform to a message thread on messaging platform is disclosed. The computer-implemented method includes monitoring an ongoing email thread. The computer-implemented method further includes migrating the email thread from an email platform to a messaging platform in response to an attribute associated with the email thread reaching and/or exceeding a predetermined threshold level, wherein the email thread includes converting contents of the email thread into one or more message threads on the messaging platform.

According to another embodiment of the present invention, a computer program product for dynamically migrating an email thread from an email platform to a message thread on messaging platform is disclosed. The computer program product includes one or more computer readable storage media and program instructions stored on the one or more computer readable storage media. The program instructions include instructions to monitor an ongoing email thread. The program instructions further include instructions to migrate the email thread from an email platform to a messaging platform in response to an attribute associated with the email thread reaching and/or exceeding a predetermined threshold level, wherein the instructions to migrate the email thread includes converting contents of the email thread into one or more message threads on the messaging platform.

According to another embodiment of the present invention, a computer system for dynamically migrating an email thread from an email platform to a message thread on messaging platform is disclosed. The computer system includes one or more computer system includes one or more computer processors, one or more computer readable storage media, and program instructions stored on the computer readable storage media for execution by at least one of the one or more processors. The program instructions include instructions to monitor an ongoing email thread. The program instructions further include instructions to migrate the email thread from an email platform to a messaging platform in response to an attribute associated with the email thread reaching and/or exceeding a predetermined threshold level, wherein the instructions to migrate the email thread includes converting contents of the email thread into one or more message threads on the messaging platform.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

DETAILED DESCRIPTION

Figure 1:
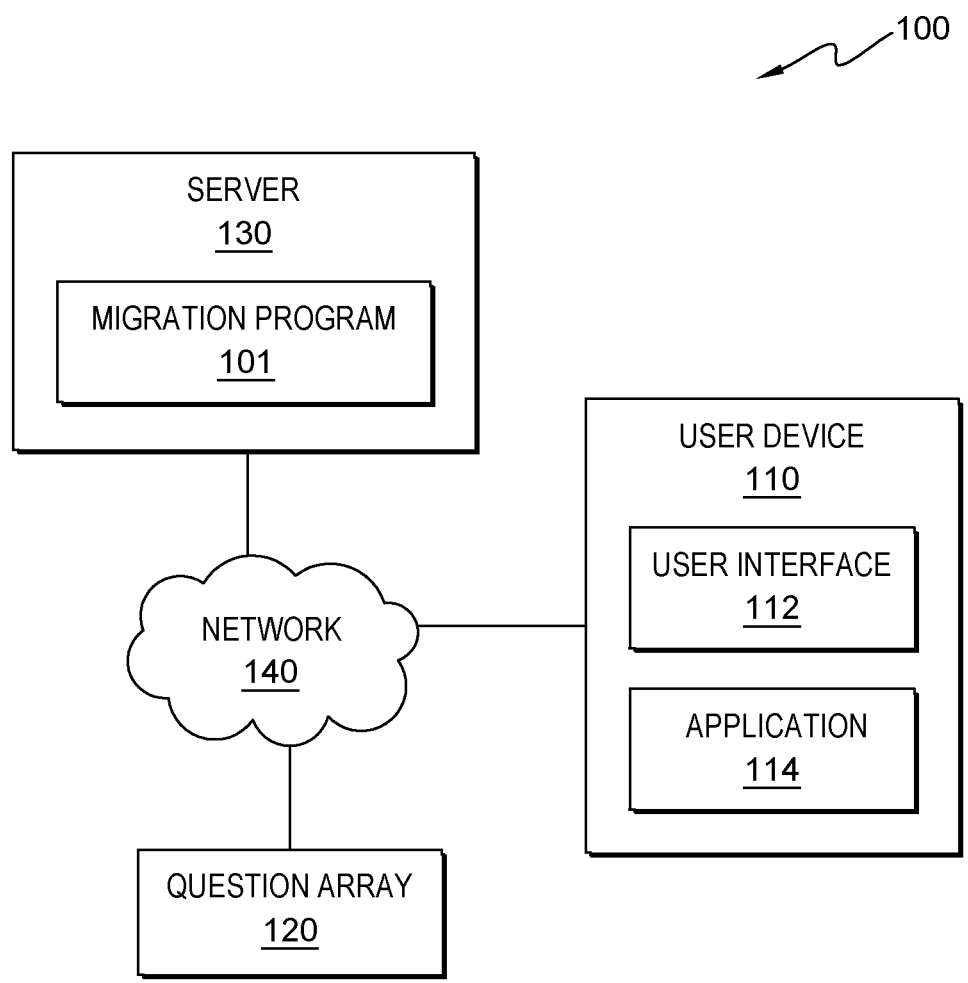
FIG. 1 is a functional block diagram of a computing network, generally designated 100, for dynamically migrating an email thread or a message thread between different communication platforms in accordance with at least one embodiment of the present invention.

The present invention relates generally to the field of electronic communications, and more particularly to dynamically migrating conversations between communication platforms.

Email remains an essential and convenient means of asynchronous communication for many. Oftentimes, what starts out as a single email can grow into a chain of emails, otherwise known as an email thread. One of ordinary skill in the art will appreciate that an email thread is an email message that includes a running list of all the subsequent reply and forward emails stemming from an original email. Typically, emails within an email thread are visually arranged relative to the original email and in chronological order from top to bottom or vice versa depending on the particular email client or user preferences. Although an email thread is useful for keeping track of past conversations, embodiments of the present invention recognize that as the length of an email thread and the number of sub-threads stemming from an initial thread grow, it becomes increasingly difficult to follow along with the conversation. This further becomes problematic as participants within an email thread are added and removed, as well as when the initial topic of the email thread goes astray.

Embodiments of the present invention improve upon the foregoing deficiencies by providing a method, computer program product, and computer system for dynamically migrating conversations generated via an email platform to a messaging platform and vice versa. According to embodiments of the present invention, conversations are automatically migrated between communication platforms based on a policy or set of rules that dictate when a conversation is migrated, which particular portions of a conversation are migrated, as well as how the migrated portions of a conversation are organized and displayed to a user. Thus, embodiments of the present invention seamlessly transition conversations between communication platforms without the need for manual user intervention to select and organize portions of a conversation in a meaningful manner when migrating a conversation between communication platforms. For example, email threads having a lot of recipients or a lot of questions may be better suited as a message thread. In another example, a message thread that grows stale—messages are far and few between—or is lacking in the number of unanswered questions may be better suited as an email thread.

In one embodiment of the present invention, a policy coupled with a unique scoring system is used to determine when an email thread should be migrated from an email platform (e.g., webmail or an email client) to a messaging platform (e.g., messaging application or short messaging service (SMS)). As each subsequent email is added to an email thread, the overall score is incremented or decremented according to various characteristics and factors associated with the email. Once the overall score of an email thread reaches and/or exceeds a predetermined threshold value, the contents of the email thread are automatically migrated from an email platform to a messaging platform.

In another embodiment of the present invention, a policy or set of rules is used to determine when a message thread should be migrated from a messaging platform (e.g., social media messenger application, mobile messaging application) to an email platform (e.g., webmail or an email client). The message thread is analyzed to identify question-answer pairs (i.e., questions and the answers to respective questions. Questions may be initially identified and stored in a question array (i.e., storage array). As each question-answer pair is identified, the corresponding question is removed from the question array. Once the number of questions in the question array falls below a predetermined threshold level, the message thread is monitored for a predetermined period of time for new questions posed in the message thread. If no new questions are identified during the predetermined monitoring period, the contents of the message thread are automatically migrated from a messaging platform to an email platform.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" and "dynamically" mean without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "real time" means a level of processing responsiveness that a user or system senses as sufficiently immediate for a particular process or determination to be made, or that enables the processor to keep up with some external process.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user" and "individual" each refer to a human being.

The terms first, second, etc. may be used herein to describe various elements. These elements should not be limited by these terms, as these terms are only used to distinguish one element from another unless stated otherwise or the context clearly indicates otherwise.

As defined herein, "email platform" means the environment in which a piece of software is executed, and may be the hardware, the operating system (OS), web browser, associated application programming interfaces, or other underlying software used to access and manage a user's email (i.e., electronic mail). For example, an "email platform" may be webmail (i.e., web-based email) or an email client.

As defined herein, "messaging platform" means the environment in which a piece of software is executed, and may be the hardware, the operating system (OS), or even a web browser, associated application programming interfaces, or other underlying software used to access and manage instant messages and/or text messages. For example, a "messaging platform" may be an email messenger, social media messenger, mobile messaging application, or short message service (SMS).

As defined herein, "email thread" is a single email conversation that starts with an original email (i.e., the beginning of the conversation), and includes all of the subsequent replies and forwards pertaining to the original email.

As defined herein, "message thread" is a single instant message conversation and/or text message conversation that includes a running commentary of all the messages sent within a private message (i.e., "personal message", "private message" (PM), "direct message" (DM), or "personal chat" (PC), group message, and/or channel.

The present invention will now be described in detail with reference to the Figures. FIG. 1 is a functional block diagram of a computing system, generally designated 100, for dynamically migrating a message thread between communication platforms in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Computing system 100 includes user device 110, question array 120, and server 130 interconnected over network 140. In various embodiments of the present invention, network 140 can be a telecommunications network, a local area network (LAN), a wide area network (WAN), such as the Internet, or a combination of the three, and can include wired, wireless, or fiber optic connections. Network 140 may include one or more wired and/or wireless networks that are capable of receiving and transmitting data, voice, and/or video signals, including multimedia signals that include voice, data, and video information. In general, network 140 may be any combination of connections and protocols that will support communications between user device 110, question array 120, server 130, and other computing devices (not shown) within computing environment 100.

In various embodiments of the present invention, user device 110 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, user device 110 represents any programmable electronic device or combination of programmable electronic devices capable of executing machine readable program instructions and communicating with question array 120, server 130, and other computing devices (not shown) within computing environment 100 via a network, such as network 140.

User device 110 includes user interface 112. User interface 112 provides an interface between user device 110, question array 120, server 130, and migration program 101. In some embodiments, user interface 112 can be a graphical user interface (GUI) or a web user interface (WUI) and can display text, documents, web browser windows, user options, application interfaces and instructions for operation, and includes the information (such as graphic, text, and sound) that a program presents to a user and the control sequences the user employs to control the program. In other embodiments, user interface 112 can be a script, application programming interface (API), or mobile application software that provides an interface between user device 110, question array 120, server 130, and migration program 101.

User device 110 further includes application 114. Application 114 can be representative of one or more applications (e.g., an application suite) that operate on user device 110. In various example embodiments, application 114 can be an application that a user of user device 110 utilizes to send and receive data, such as a mobile device application, web client, enterprise-specific messaging application, and social media application. In an embodiment, application 114 can be a client-side application associated with server 130 (e.g., a client-side application associated with migration program 101). In an embodiment, application 114 can operate to perform processing steps of migration program 101 (i.e., application 114 can be representative of migration program 101 operating on user device 110), in accordance with various embodiments of the present invention.

In various embodiments of the present invention, storage array 120 is a data repository for persistently storing and managing collections of data. In an embodiment, storage array 120 is a relational or non-relational database accessed by migration program 101, user device 110 and/or server 130 to store and retrieve questions and answers included in a message thread. In an embodiment, questions associated with an identified question-answer pair are removed from storage array 120. In an embodiment, answers associated with an identified question-answer pair are removed from storage array 120.

In various embodiments of the present invention, server 130 is a computing device that can be a standalone device, a management server, a web server, an application server, a mobile device, or any other electronic device or computing system capable of receiving, sending, and processing data. In an embodiment, server 130 represents a server computing system utilizing multiple computers as a server system, such as in a cloud computing environment. In an embodiment, server 130 represents a computing system utilizing clustered computers and components (e.g. database server computer, application server computer, web server computer, webmail server computer, media server computer, etc.) that act as a single pool of seamless resources when accessed within computing environment 100. In general, server 130 represents any programmable electronic device or combination of programmable electronic devices capable of executing machine readable program instructions and communicating with each as other, as well as with user device 110, question array 120, and migration program 101 within computing environment 100 via a network, such as network 140.

Server 130 further includes migration program 101. In an embodiment, migration program 101 operates on a central server, such as server 130, and can be utilized by one or more user devices, such as user device 110, via an application download from the central server or a third-party application store, and executed on client device 110. In an embodiment, migration program 101 may be software, downloaded from a central server, such as server 130, and installed on one or more user devices, such as user device 110. In an embodiment, migration program 101 may be utilized as a software service provided by a third-party cloud service provider (not shown). In an embodiment, migration program 101 may include one or more components, such as add-ons, plug-ins, and agent programs, etc. (not shown), installed on one or more user devices, such as user device 110. For example, program 101 may be integrated with an email client software, social media application, or instant messaging service.

In various embodiments of the present invention, a scoring policy is implemented to determine when an email thread should be migrated from an email platform to a messaging platform. In an embodiment, migration program 101 increments an overall score associated with an email thread on an email platform based, at least in part, on one or more of the following: (i) the total number of emails included in an email thread, (ii) the frequency at which new emails are added to an email thread, (iii) the number of personal identifiers associated with recipients of an email located in the body of an email, (iv) the number of sentences contained in the body of an email, (v) the number of questions posed that remain unanswered, and (vi) the type of questions posed (e.g., open-ended vs. close-ended question).

In an embodiment, migration program 101 increments an overall score associated with a message thread on a messaging platform based, at least in part, on one or more of the following: (i) the total number of messages includes in a message thread, (ii) the frequency at which new messages are added to the message thread, (iii) the number of personal identifiers associated with recipients of messages included in the message thread (e.g., the recipients of a group chat), (iv) the number of sentences contained in the message thread, (v) the number of questions posed that remain unanswered in the message thread, and (vi) the type of questions posed (e.g., open-ended vs. close ended question).

In an embodiment, migration program 101 generates a vector for each sentence of a message thread. For example, vector encoded sentences are input into a pretrained machine learning model, such as a Bidirectional Encoder Representations from Transformers (BERT) model in order to determine whether a sentence is a question. If a sentence is determined to be a question, migration program 101 may utilize additional machine learning model(s) to determine whether a sentence is an open-ended question or a closed-ended question. In an embodiment, the manner in which migration program 101 increments the overall score of a messaging thread is dependent on the type of question identified. For example, open-ended questions are given a greater weight or score than close-ended questions.

In other embodiments, migration program 101 determines whether a sentence is a question based on user input. For example, a user may highlight or otherwise select a portion of the content of a message thread as including a question. In another example, migration program 101 may generate a pop-up box and present the pop-up box to a user via a user device, such as user device 110. The pop-up box may contain a particular sentence and prompt a user to select from a drop-down menu "yes" or "no" to indicate whether the particular sentence is a question, and if the sentence is in fact a question, the pop-up box may further prompt the user to make a selection indicative of whether the question is an "open-ended question" or "close-ended question."

In some embodiments, if a sentence is determined to be a question, migration program 101 identifies one or more sentences that are associated with an answer to the question. In other words, migration 101 program identifies question-answer pairs. In an embodiment, migration program 101 calculates similarity scores between one or more vector encoded sentences and a vector encoded question. If the calculated similarly value between two sentences is at or above a predetermined threshold, the two sentences are deemed to be a question-answer pair. However, if the calculated similarly value between two sentences is below a predetermined threshold, the two sentences are not deemed to be a question-answer pair.

In other embodiments, if a sentence is determined to be a question, migration program 101 determines whether one or more sentences are an answer to a question based on user input. For example, a user may highlight or otherwise select a portion of the content of a message thread as including an answer to an identified question. In another example, migration program 101 may generate a pop-up box and present the pop-up box to a user via a user device, such as user device 110. The pop-up box may contain a particular sentence and prompt a user to select from a drop-down menu "yes" or "no" to indicate whether the particular sentence is an answer to the identified question, and if the sentence is not an answer to the identified question, the pop-up box may further prompt the user to make a selection indicative of the particular sentence(s) that are an answer to a question posed.

In some embodiments, questions identified in a message thread are added to a question array, such as question array 120. In an embodiment, if a question-answer pair is identified, migration program 101 removes the question from question array 120. This will help to preserve computing resources required when attempting to find future question-answer pairs by reducing the possible number of questions available for comparison. In an embodiment, the overall score of a message thread is decremented based on identifying a question-answer pair.

In an embodiment, migration program 101 migrates the contents of an email thread from an email platform to a messaging platform based, at least in part, on a number of emails within an email thread or sub-thread reaching and/or exceeding a predetermined threshold level. For example, if an email thread reaches twenty emails, the contents of the email thread are automatically migrated from an email client to an SMS of a mobile device, such as user device 110. Similarly, if an email sub-thread reaches ten emails, the contents of the email sub-thread are automatically migrated from a webmail to a messaging application. In an embodiment, migration program 101 migrates the contents of an email thread from an email platform to a messaging platform based, at least in part, on a frequency of emails added to the email thread or sub-thread reaching and/or exceeding a predetermined threshold level. For example, if the rate at which new emails are added to an email thread exceeds 10 emails per hour, the contents of the email thread are automatically migrated from an email client to an online live chat service. Similarly, if the rate at which new emails are added to an email sub-thread exceeds 5 emails per hour, the contents of the email sub-thread are automatically migrated from a webmail to a social media messaging application.

In an embodiment, migration program 101 migrates the contents of an email thread from an email platform to a messaging platform based, at least in part, on a number of conversational topics within the email thread reaching and/or exceeding a predetermined threshold level. For example, if two or more conversational topics within the same email thread are detected, two separate message threads are generated on a messaging platform—one message thread for each conversational topic. Accordingly, migration program 101 migrates the contents associated with each conversational topic to a message thread corresponding to a particular conversational topic. In an embodiment, in response to determining that a question included in an email thread is an open-ended question, the email thread is automatically migrated from an email platform to a messaging platform.

In an embodiment, migration program 101 migrates the contents of an email thread from an email platform to a messaging platform based, at least in part, on the number of participants in an email thread. For example, if the number of participants or recipients in an email thread reach and/or exceed a predetermined threshold level, migration program 101 generates a group message thread on a messaging platform and migrates the contents of the email thread to the group message thread. In an embodiment, if a number of members in the group message thread fall below a predetermined threshold level, migration program 101 automatically migrates the content of the message thread from the messaging platform back to the original email thread on the email platform.

In an embodiment, migration program 101 designates the person who generated the initial email in an email thread as an administrator for those messaging channels in which information is migrated to. The administrator may be further given various administrative privileges, including, but not limited to: (i) adding or removing users to a message thread, (ii) deleting messages or content form the message thread, and (iii) re-migrating a portion or all of the message thread to an email thread. In an embodiment, migration program 101 designates additional admins having various degrees of administrative privileges for those individuals who initiated a conversation for a particular email thread or sub-thread.

In an embodiment, upon determining that a conversation migrated from an email platform to a messaging platform has reached an adequate conclusion and/or the conversation has become stagnant, a user may optionally select particular messages to be migrated from a message thread on a messaging platform back to an email thread on an email platform.

In an embodiment, the contents of a message thread are migrated from a messaging platform to an email platform based, at least in part, on a frequency of messages associated with the message thread reaching and/or falling below a predetermined threshold level. For example, if the number of messages sent and/or received via SMS is below 5 messages per day, the contents of the messaging thread are automatically migrated from an SMS provider to one or more emails. In an embodiment, the contents of a message thread are migrated from a messaging platform to an email platform based, at least in part, on a number of unanswered questions reaching and/or falling below a predetermined threshold level. For example, if the number of unanswered questions in a message thread of a mobile application messenger falls below two unanswered messages, the messaging thread is automatically migrated from the mobile application messenger to one or more emails.

Figure 2:
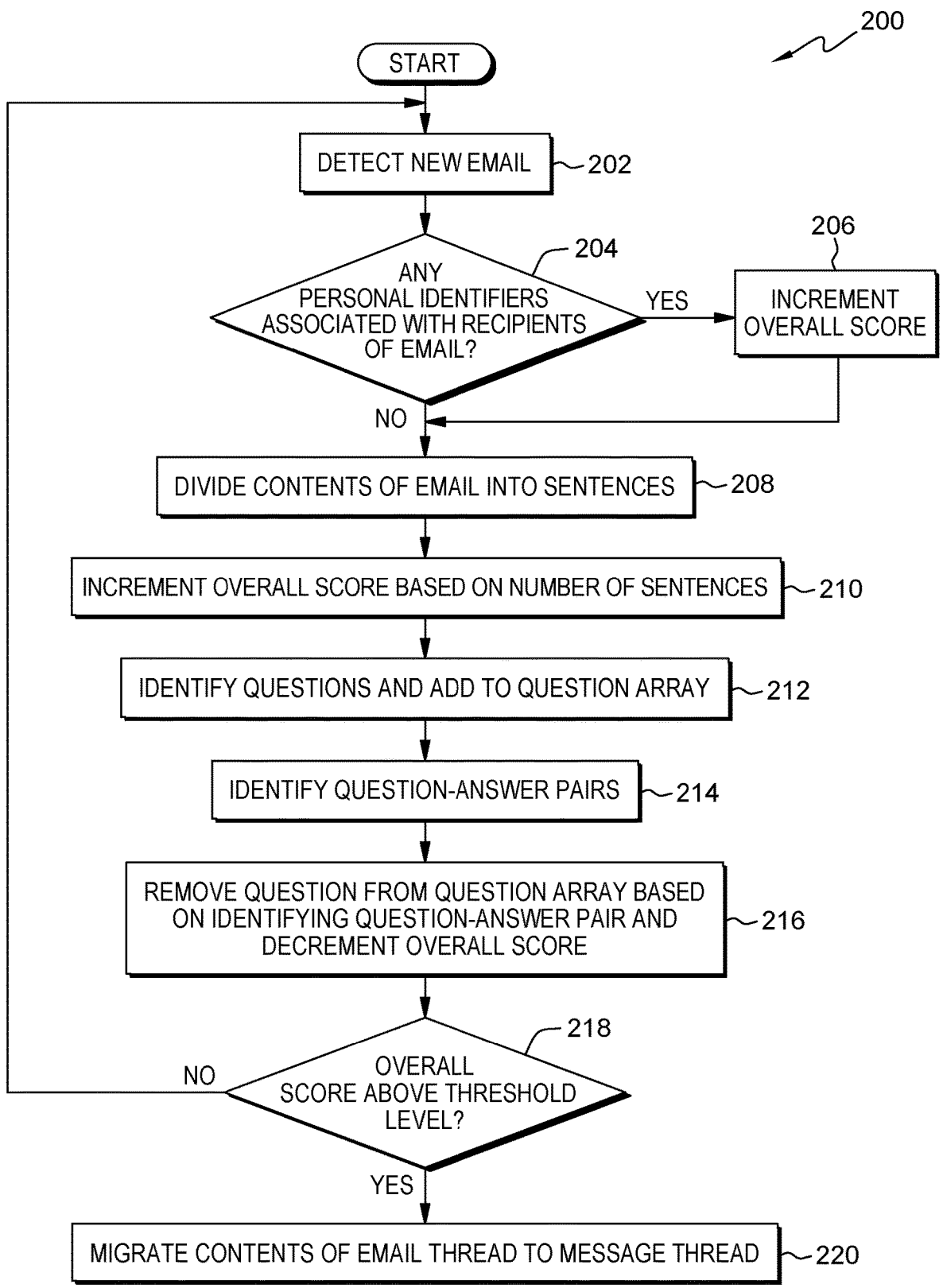
FIG. 2 is a flowchart diagram, generally designated 200, depicting operational steps for dynamically migrating an email thread on an email platform to a message thread on a messaging platform in accordance with at least one embodiment of the present invention.

FIG. 2 is a flowchart diagram, generally designated 200, depicting operational steps for dynamically migrating a message thread on an email platform to a message thread on a messaging platform in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

At step S202, program 101 identifies a new email. In an embodiment, a new email is an original email having an initial set of recipients. For example, Bob initiates a conversation by sending an email to Jane, Mark, and Phil. In an embodiment, a new email is a reply to or forwarding of a previous email. For example, Jane replies to Bobs email by sending a reply email to Bob and copies (cc's) Mark and Phil on the reply email. In another example, Bob forwards the email to Sara after realizing that he inadvertently forgot to send the original email to Sara.

At decision step S204, program 101 determines whether the body of the new email includes any personal identifiers associated with any recipients of the email. A personal identifier may include, but is not limited to, one or more of an email address, name, known aliases, and social media accounts associated with a recipient. For example, program 101 compares any email addresses and/or names included in the "To:" section of the header of Bob's email with any email addresses, names, and/or associated aliases included in the body of the email. In an embodiment, the body of the email further includes any attachments associated with the email. For example, if Jane's reply to Bob's email included an attachment, program 101 compares any email addresses and/or names included in the "To:" and "Cc:" section of the header of Jane's reply email with any email addresses, names, and/or associated aliases included in the attachment of Jane's reply email.

In response to determining that the body of the email does include one or more personal identifiers associated with one or more recipients of the email (decision step "NO" branch, program 101 proceeds to step S208. In response to determining that the body of the email does include one or more personal identifiers associated with one or more recipients of the email, program 101 proceeds to step S206.

At step S206, program 101 increments a score associated with the email. In an embodiment, the score is incremented for each instance that a personal identifier associated with a recipient of the email is identified in the body of the email or in an attachment of the email. For example, if the name Phil is identified three times, an email phil@patent123.com associated with Phil is identified two times, and a social media account @Phil_123 associated with Phil is identified once in the body of the email, the score may be incremented by six. In an embodiment, the score is incremented only once if a personal identifier associated with a recipient is identified, regardless of the number of instances of a personal identifier or the number of different personal identifiers associated with a recipient identified in the body of the email. Thus, if the name Phil is identified three times, the email phil@patent123.com associated with Phil is identified two times, and the social media account @Phil_123 associated with Phil is identified once, the score may be incremented by one.

At step S208, program 101 divides the contents of the body of the email into sentences. For example, program 101 performs sentence segmentation or tokenization to divide the contents of the body of the email into separate sentences or tokens. One of ordinary skill in the art will appreciate that text segmentation is the division of a text string into discrete sentences or substrings. For example, the text string "I have so many emails in my inbox—which emails do you think can be deleted?" may be broken up into two separate sentences: "I have so many emails in my inbox" and "which emails do you think can be deleted?".

At step S210, migration program 101 increments the score based on the number of sentences in the email. In an embodiment, the score is incremented for each sentence included in the body of the email. For example, if the body of the email is divided into ten sentences, the score is incremented by ten. In an embodiment, the score is incremented based on a total number of sentences falling within a predetermined range of values. For example, if the total number of sentences is greater than zero and less than ten, the score is incremented by one. If the total number of sentences is greater than ten and less than twenty, the score is incremented by two, and so on.

Figure 4:
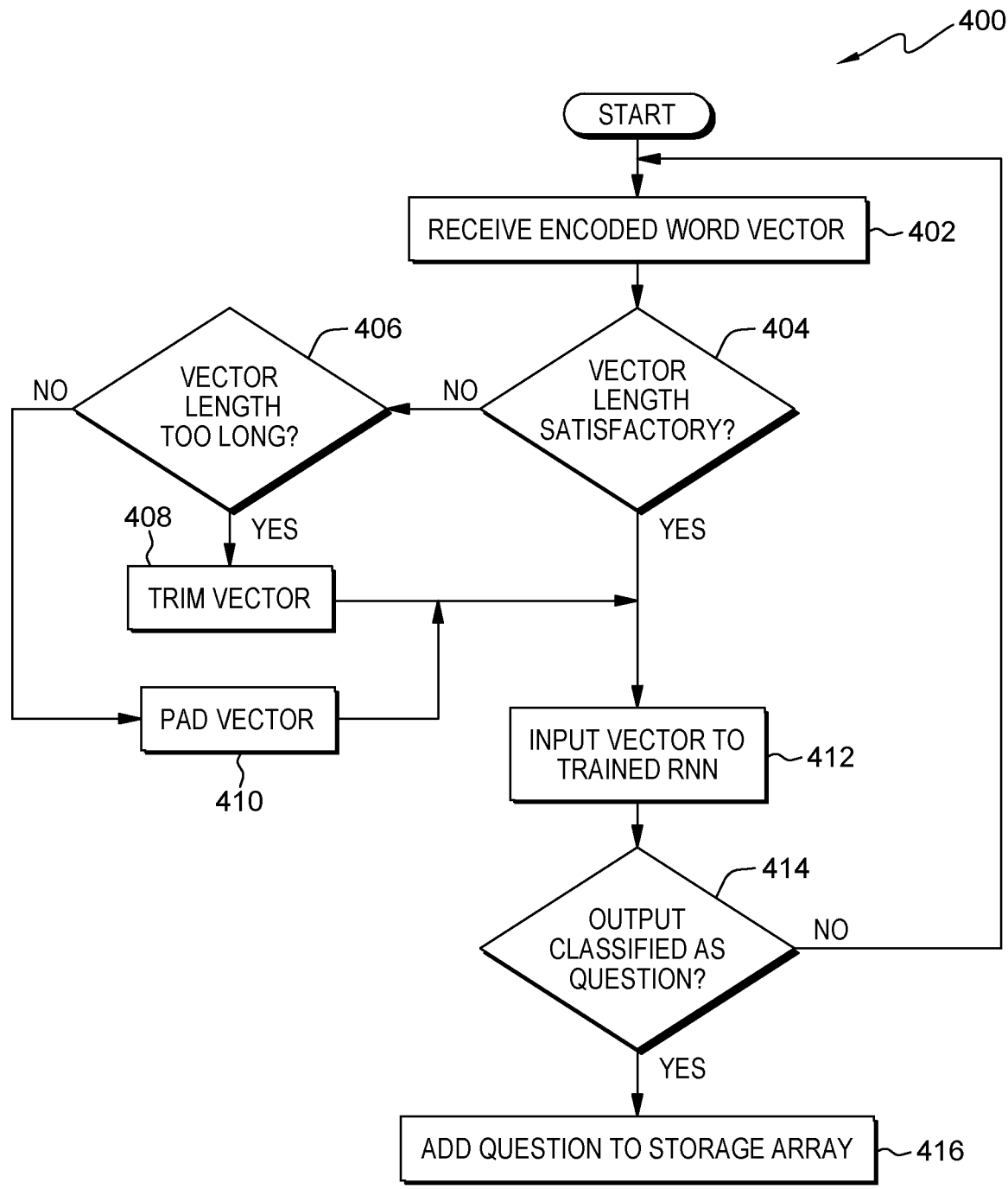
FIG. 4 is a flowchart diagram, generally designated 400, depicting operational steps for determining whether a sentence is a question in accordance with at least one embodiment of the present invention.

At step S212, migration program 101 identifies any questions included in the email and adds the questions to question array 120. In an embodiment, migration program 101 determines whether a sentence is a question in accordance with the operational steps as depicted in FIG. 4.

In an embodiment, migration program 101 identifies questions based on user input. In other words, migration program 101 receives or otherwise indicated the particular question that prompted the identified response. For example, a graphical user interface (GUI) element, such as a drop down menu, may be generated for each sentence in an email. The user may then make a user selection from the drop down menu indicating whether or not a sentence is a question. In another example, a user may be prompted, via a pop-up window, to select or input information indicative as to whether or not a particular sentence is a question.

In an embodiment, program 101 classifies a sentence as being a question by identifying sentences that contain a question mark symbol ("?"). In an embodiment, migration program 101 classifies a sentence as being a question through the use of natural language processing (NLP). For example, migration program 101 determines a question is a sentence by identifying words such as "What", "Why", "Which", "Who", "When," and "How" at the beginning of a sentence.

In an embodiment, if a sentence is determined to be a question, the overall score associated with the email thread is incremented. In an embodiment, if the question is determined to be an open-ended question (i.e., a question that cannot be answered with a "yes" or "no" response, or with a static response), the overall score associated with the email thread is further incremented.

At step 214, migration program 101 identifies question-answer pairs. In other words, migration program 101 determines whether a sentence is an answer to a question added to question array 120.

In an embodiment, migration program 101 identifies answers to a question based on user input. In other words, migration program 101 receives a user indication of the particular question and corresponding answer to the question. For example, a graphical user interface (GUI) element, such as a drop down menu, may be generated for each sentence in an email. The user may then make a user selection (e.g., "YES" or "NO") from the drop down menu to indicate whether or not a sentence is an answer to a question. If the user indicates that the sentence is an answer to a question, the user may be presented with an additional drop down menu, in which a user can select a question from a set of questions included in question array to indicate the question corresponding to the answer. In another example, a user may be prompted, via a pop-up window, to select or input information indicative as to whether or not a sentence is an answer to a particular question. If the user indicates that the sentence is an answer to a question, the user may be prompted with an additional pop-up window, in which a user can input information to indicate the particular question corresponding to the answer.

Figure 5:
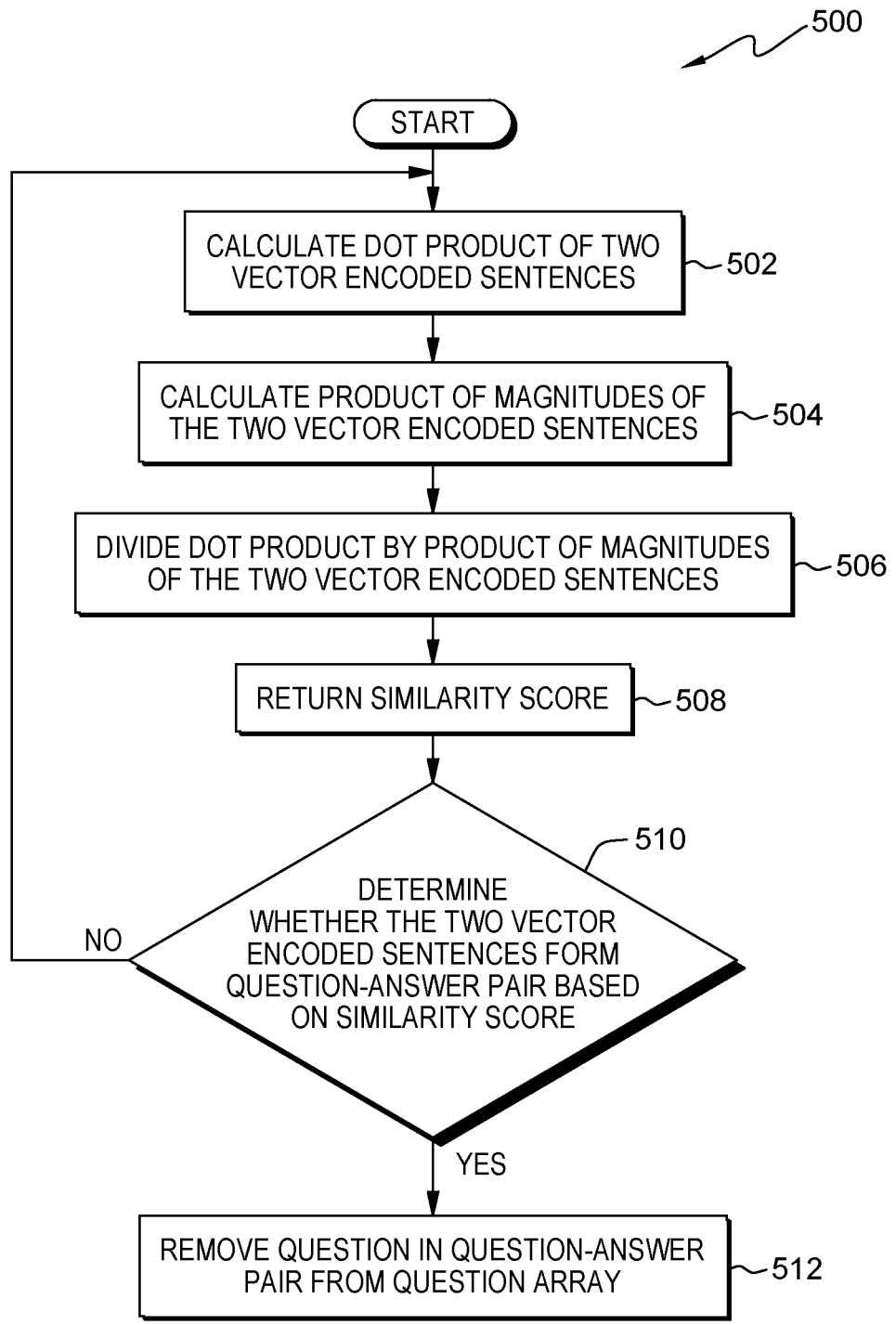
FIG. 5 is a flowchart diagram, generally designated 500, depicting operational steps for determining a similarity score between a potential question-answer pair of an email thread or a message thread in accordance with at least one embodiment of the present invention.

In an embodiment, if migration program 101 does not receive user input indicating the particular sentences that form a question-answer pair, migration program 101 identifies a question-answer pair in accordance with the operational steps as depicted in FIG. 5.

At step 216, in response to identifying a question-answer pair, the question portion of the question-answer pair is removed form questions array 120 and the overall score associated with the email thread is decremented. In an embodiment, the overall score is reduced based on the number of sentences associated with the question-answer pair. For example, if a question is one sentence long and the answer to the question is three sentences long, the score may be decremented by four points. In an embodiment, the score is decremented by the same number of points (e.g., one point) regardless of the number of sentences that formed the question-answer pair.

At decision step S218, migration program 101 determines whether the overall score associated with the email thread is above a predetermined threshold level. If migration program 101 determines that the overall score is above the predetermined threshold level (decision step S218 "YES" branch), migration program 101 proceeds to step S220. If migration program 101 determines that the overall score is not above the predetermined threshold level (decision step S218 "NO" branch), migration program 101 returns to step 202.

At step S220, migration program 101 migrates the email thread from the email platform to a messaging platform. In an embodiment, migrating the email thread includes generating one or more message threads on the messaging platform. In an embodiment, various portions of the message thread are migrated to multiple message threads. For example, different portions of the email thread are migrated to different message threads or group message threads based on respective conversational topics associated with the different portions of the email thread. In another example, if the email thread contains sub-threads, each sub-thread is migrated to a different message thread based on the respective recipients associated with a sub-thread.

Figure 3:
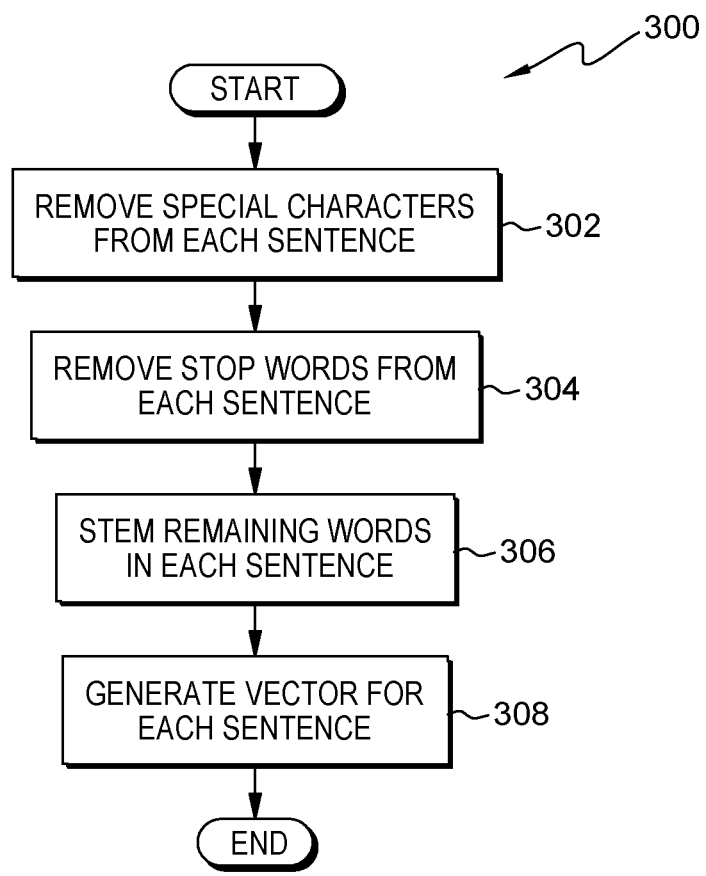
FIG. 3 is a flowchart diagram, generally designated 300, depicting operational steps for performing data cleaning on an email thread or a message thread in accordance with at least one embodiment of the present invention.

FIG. 3 is a flowchart diagram, generally designated 300, depicting operational steps for performing data cleaning on one or more sentences included in a message thread in accordance with at least one embodiment of the present invention.

At step S302, program 101 removes all special characters from each sentence. One of ordinary skill in the art will appreciate that a special character is a character that is not an alphabetic or numeric character, such as "@," "#," "$," etc.

At step S304, program 101 removes all stop words from each sentence. One of ordinary skill in the art will appreciate that a stop words are common words (e.g. "a," "an," "the," etc.) used in a language that are filtered out before or after processing of natural language data.

At step S306, program 101 stems all of the remaining words in each sentence. One of ordinary skill in the art will appreciate that stemming is the process of reducing a word to its word stem. In other words, stemming is the process of removing the suffix form a word to reduce it to its root word. For example, the word "emailing" is stemmed to arrive at the root word "email."

At step S308, after removing all special characters and stop words, and stemming any remaining words, program 101 generates a vector for each sentence in the message thread. In an embodiment, a vector is generated for a sentence by inputting the sentence into a pretrained Bidirectional Encoder Representations from Transformers (BERT) model. The resulting output is an encoded vector representative of the original text sentence. One of ordinary skill in the art will appreciate that a BERT model applies bidirectional training of Transformer, a type of attention model, to language modelling.

FIG. 4 is a flowchart diagram, generally designated 400, depicting operational steps for determining whether a sentence is an answer to a question in accordance with at least one embodiment of the present invention. At step S402, migration program 101 receives a vector encoded sentence. For example, migration program 101 receives a vector encoded sentence previously generated in accordance with the operational steps as depicted in FIG. 3.

At step S404, migration program 101 determines whether the length (i.e., magnitude) of the vector encoded sentence is satisfactory. In an embodiment, the magnitude is satisfactory if the magnitude falls within a predetermined range. Accordingly, the magnitude of a vector is deemed unsatisfactory is the magnitude falls outside of the predetermined range (i.e., the magnitude is less than or great than the predetermined range of values).

If migration program 101 determines that the vector length is satisfactory (decision step S404 "YES" branch), migration program 101 proceeds to step S412. If program 101 determines that the vector length is unsatisfactory, program 101 proceeds to decision step S406.

At decision step S406, migration program 101 determines if the vector length (i.e., magnitude) is too long. If migration program 101 determines that the length of the vector is too long (decision step S406 "YES" branch), program 101 proceeds to step S408. If migration program 101 determines that the length of the vector is too short, migration program 101 proceeds to step S410.

At step S408, migration program 101 trims the vector until the length of the vector falls within the predetermined range of satisfactory values. For example, the vector length is decreased by trimming or removing zero values formed at the beginning and/or end of the vector. At step S410, migration program 101 increases the length of the vector until the length falls within the predetermined range of satisfactory values. For example, the vector is padded with zeros at the beginning and/or end of the vector.

At step 412, migration program 101 inputs the vector encoded sentence into a Recursive Neural Network (RNN) that has been trained (e.g., using supervised or semi-supervised learning methods) to classify the vector encoded sentence as a particular type of sentence. For example, the RNN may return a value between zero and one, where one is representative of a 100% likelihood that a sentence is a question and zero being representative of a 0% likelihood that a sentence is a question.

At decision step 414, migration program 101 determines whether the sentence is classified as question. In an embodiment, a sentence is determined to be a question if the value returned by the RNN is equal to and/or greater than a predetermined threshold (e.g., 0.8).

If migration program 101 does not classify the sentence as a question (decision step S414 "NO" branch), migration program 101 returns to step 402 to determine whether a subsequent sentence is question. If migration program 101 classifies the sentence as a question (decision step S414 "YES" branch), program 101 proceeds to step 416.

At step 416, migration program 101 adds the question to a storage array, such as storage array 120 of FIG. 1.

FIG. 5 is a flowchart diagram, generally designated 500, depicting operational steps for determining whether a sentence is an answer to a particular question (i.e. a question-answer pair). In an embodiment, migration program 101 determines whether two sentences form a question-answer pair based on a cosine similarity between two encoded vectors representative of a question and a potential answer to the question. In an embodiment, encoded vectors are taken from the sentences encoded in accordance with the operational steps depicted in FIG. 3.

At step S502, migration program 101 calculates a dot product (i.e., the sum of the products) of a first vector representing a question included in a message thread and a second vector representing a potential answer to the question. For example, a question from question array 120 is selected for comparison with the potential answer to the question. The question and the potential answer may be found in the same email or different emails in the email thread. Accordingly, questions may be initially selected from the same email in which the answer is located. If migration program 101 is unable to find a question-answer pair from questions selected from the same email, questioned from subsequent emails in the email thread are selected for comparison.

At step S504, migration program 101 multiplies a magnitude of the first vector representing the question and a magnitude of the second vector representing the potential answer to the question. At step S506, migration program 101 divides the dot product of the two vectors (determined in step S502) by the product of the magnitudes of the two vectors to return a similarly value of the two vectors.

At step S508, migration program 101 returns a similarly score for the first vector representing the question and the second vector representing the potential answer to the question.

At decision step S510, migration program 101 determines whether the two vector encoded sentences form a question-answer pair. In an embodiment, if the similarity score of the two vectors is at and/or above a predetermined threshold value (e.g., 0.85/1.00), then migration program 101 concludes that the two vectors are a question-answer pair. Similarly, if the similarity score of the two vectors is below a predetermined threshold value (e.g., 0.85/1.00), migration program 101 concludes that the two vectors are not a question-answer pair.

If migration program 101 determines that the two vector encoded sentences form a question-answer pair (decision step S510 "YES" branch), migration program 101 proceeds to step S512. If migration program 101 determines that the two vector encoded sentences do not form a question-answer pair (decision step S510 "NO" branch), migration program 101 selects another question (e.g., from question array 120) for comparison to the potential answer to a question and returns to step 502.

At step S512, migration program 101 removes the question in the question-answer pair from question array 120. Eliminating questions from matched question-answer pairs will ultimately reduce the number of iterations of the operations of FIG. 5 to determine similarity scores for subsequent potential question-answer pairs, which ultimately will reduce compute processing.

Figure 6:
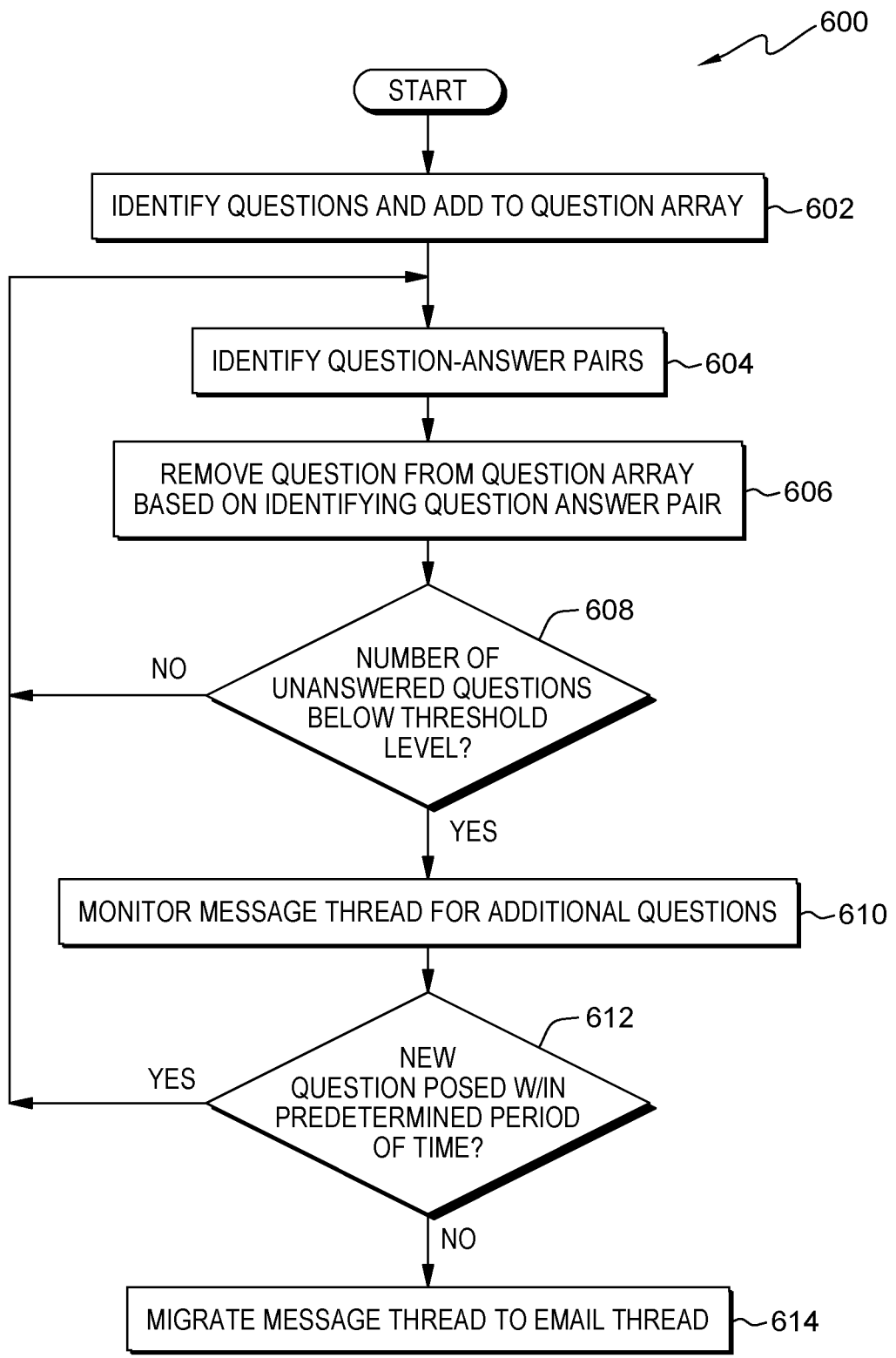
FIG. 6 is a flowchart diagram, generally designated 600, depicting operational steps for dynamically migrating a message thread on a messaging platform to an email thread on an email platform in accordance with at least one embodiment of the present invention.

FIG. 6 is a flowchart diagram, generally designated 600, depicting operational steps for dynamically migrating the contents of a message thread on a messaging platform to an email thread on an email platform in accordance with at least one embodiment of the present invention.

At step S602, migration program 101 identifies any questions included in a message thread and adds the questions to question array 120. In an embodiment, migration program 101 determines whether a sentence is a question in accordance with the operational steps as depicted in FIG. 4.

In an embodiment, migration program 101 identifies questions based on user input. In other words, migration program 101 receives or otherwise indicated the particular question that prompted the identified response. For example, a graphical user interface (GUI) element, such as a drop down menu, may be generated for each sentence in a message thread. The user may then make a user selection from the drop down menu indicating whether or not a sentence is a question. In another example, a user may be prompted, via a pop-up window, to select or input information indicative as to whether or not a particular sentence is a question.

In an embodiment, program 101 classifies a sentence as being a question by identifying sentences that contain a question mark symbol ("?"). In an embodiment, migration program 101 classifies a sentence as being a question through the use of natural language processing (NLP). For example, migration program 101 determines a question is a sentence by identifying words such as "What", "Why", "Which", "Who", "When," and "How" at the beginning of a sentence.

At step 604, migration program 101 identifies question-answer pairs. In other words, migration program 101 determines whether a sentence is an answer to a question added to question array 120.

In an embodiment, migration program 101 identifies answers to a question based on user input. In other words, migration program 101 receives a user indication of the particular question and corresponding answer to the question. For example, a graphical user interface (GUI) element, such as a drop down menu, may be generated for each message in a message thread. The user may then make a user selection (e.g., "YES" or "NO") from the drop down menu to indicate whether or not a message includes an answer to a question. If the user indicates that a message is an answer to a question, the user may be presented with an additional drop down menu, in which a user can select a question from a set of questions included in question array to indicate the question corresponding to the answer. In another example, a user may be prompted, via a pop-up window, to select or input information indicative as to whether or not a message includes an answer to a particular question. If the user indicates that the sentence is an answer to a question, the user may be prompted with an additional pop-up window, in which the user can input information to indicate the particular question corresponding to the answer.

In an embodiment, if migration program 101 does not receive user input indicating the particular sentences that form a question-answer pair, migration program 101 identifies a question-answer pair in accordance with the operational steps as depicted in FIG. 5.

At step 606, in response to identifying a question-answer pair, the question portion of the question-answer pair is removed from questions array 120 and the overall score associated with the email thread is decremented. In an embodiment, the overall score is reduced based on the number of sentences associated with the question-answer pair. For example, if a question is one sentence long and the answer to the question is three sentences long, the score may be decremented by four points. In an embodiment, the score is decremented by the same number of points (e.g., one point) regardless of the number of sentences that formed the question-answer pair.

At decision step S608, migration program 101 determines whether all questions posed in a message thread have been answered. In an embodiment, all questions are deemed to have been answered if no questions remain in question array 120. In an alternative embodiment, migration program 101 determines whether a number of questions posed in a message thread have reached and/or fallen below a predetermined threshold. For example, given a threshold value of three questions, program 101 determines that only two questions remain in question array 120. In other words, only two questions contained in the message thread remain unanswered.

If program 101 determines that the number of unanswered questions in the message thread is above the predetermined threshold number of questions (decision step S608 "NO" branch), program returns to step 604. If migration program 101 determines that the number of unanswered questions in the message thread is at and/or below the predetermined threshold number of questions (decision step S608 "YES" branch), migration program 101 proceeds to step S610.

At step S610, migration program 101 monitors the message thread for additional questions. In an embodiment, the message thread is monitored for additional messages for a predetermined period of time. For example, the message thread may be monitored for one hour, one day, or one week.

At decision step S612, migration program 101 determines whether a new question is posed in the message thread within the predetermined period of time. If migration program 101 determines that a new question is posed in the message thread within the predetermined period of time (decision step S612 "YES" branch), migration program 101 returns to step S602. If migration program 101 determines that a new question is not posed in the message thread within the predetermined period of time (decision step S612 "NO" branch), migration program 101 proceeds to step S614.

At step S614, migration program 101 migrates the message thread from a messaging platform to an email platform. In an embodiment, the entire message thread is migrated to a single email. In an embodiment, various portions of the message thread are migrated to multiple emails. For example, different portions of the message thread are migrated to different emails or sub-threads based on respective conversational topics associated with the different portions of the message thread. In another example, if the message thread is a group message, different portions of the message thread are migrated to different emails or sub-threads based on respective participants associated with the different portions of the message thread.

Figure 7:
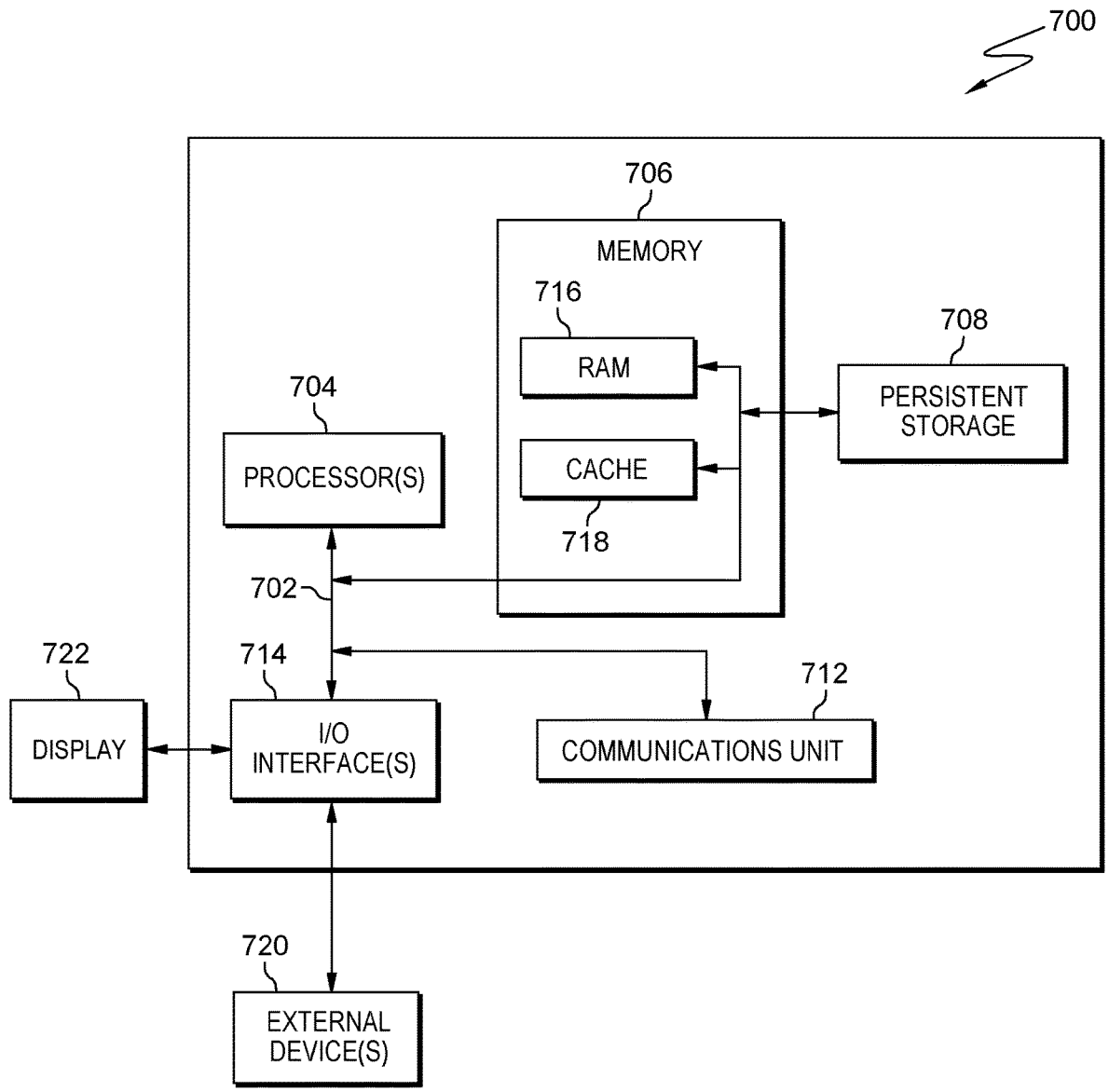
FIG. 7 is a block diagram depicting components of a computer system, generally designated 700, in accordance with at least one embodiment of the present invention. For example, computer system 700 is illustrative of server 130 of computing environment 100.

FIG. 7 is a block diagram depicting components of a computing device, generally designated 700, suitable for executing pagination program 101 in accordance with at least one embodiment of the invention. Computing device 700 includes one or more processor(s) 704 (including one or more computer processors), communications fabric 702, memory 706 including, RAM 716 and cache 718, persistent storage 708, communications unit 712, I/O interface(s) 714, display 722, and external device(s) 720. It should be appreciated that FIG. 7 provides only an illustration of one embodiment and does not imply any limitations with regard to the environments in which different embodiments may be implemented. Many modifications to the depicted environment may be made.

As depicted, computing device 700 operates over communications fabric 702, which provides communications between computer processor(s) 704, memory 706, persistent storage 708, communications unit 712, and input/output (I/O) interface(s) 714. Communications fabric 702 can be implemented with any architecture suitable for passing data or control information between processor(s) 704 (e.g., microprocessors, communications processors, and network processors), memory 706, external device(s) 720, and any other hardware components within a system. For example, communications fabric 702 can be implemented with one or more buses.

Memory 706 and persistent storage 708 are computer readable storage media. In the depicted embodiment, memory 706 includes random-access memory (RAM) 716 and cache 718. In general, memory 706 can include any suitable volatile or non-volatile one or more computer readable storage media.

Program instructions for migration program 101 can be stored in persistent storage 708, or more generally, any computer readable storage media, for execution by one or more of the respective computer processor(s) 704 via one or more memories of memory 706. Persistent storage 708 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 712, in these examples, provides for communications with other data processing systems or devices. In these examples, communications unit 712 can include one or more network interface cards. Communications unit 712 may provide communications through the use of either or both physical and wireless communications links. In the context of some embodiments of the present invention, the source of the various input data may be physically remote to computing device 700 such that the input data may be received, and the output similarly transmitted via communications unit 412.

I/O interface(s) 714 allows for input and output of data with other devices that may operate in conjunction with computing device 700. For example, I/O interface(s) 714 may provide a connection to external device(s) 720, which may be as a keyboard, keypad, a touch screen, or other suitable input devices. External device(s) 720 can also include portable computer readable storage media, for example thumb drives, portable optical or magnetic disks, and memory cards. Software and data used to practice embodiments of the present invention can be stored on such portable computer readable storage media and may be loaded onto persistent storage 708 via I/O interface(s) 714. I/O interface(s) 714 also can similarly connect to display 722. Display 722 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
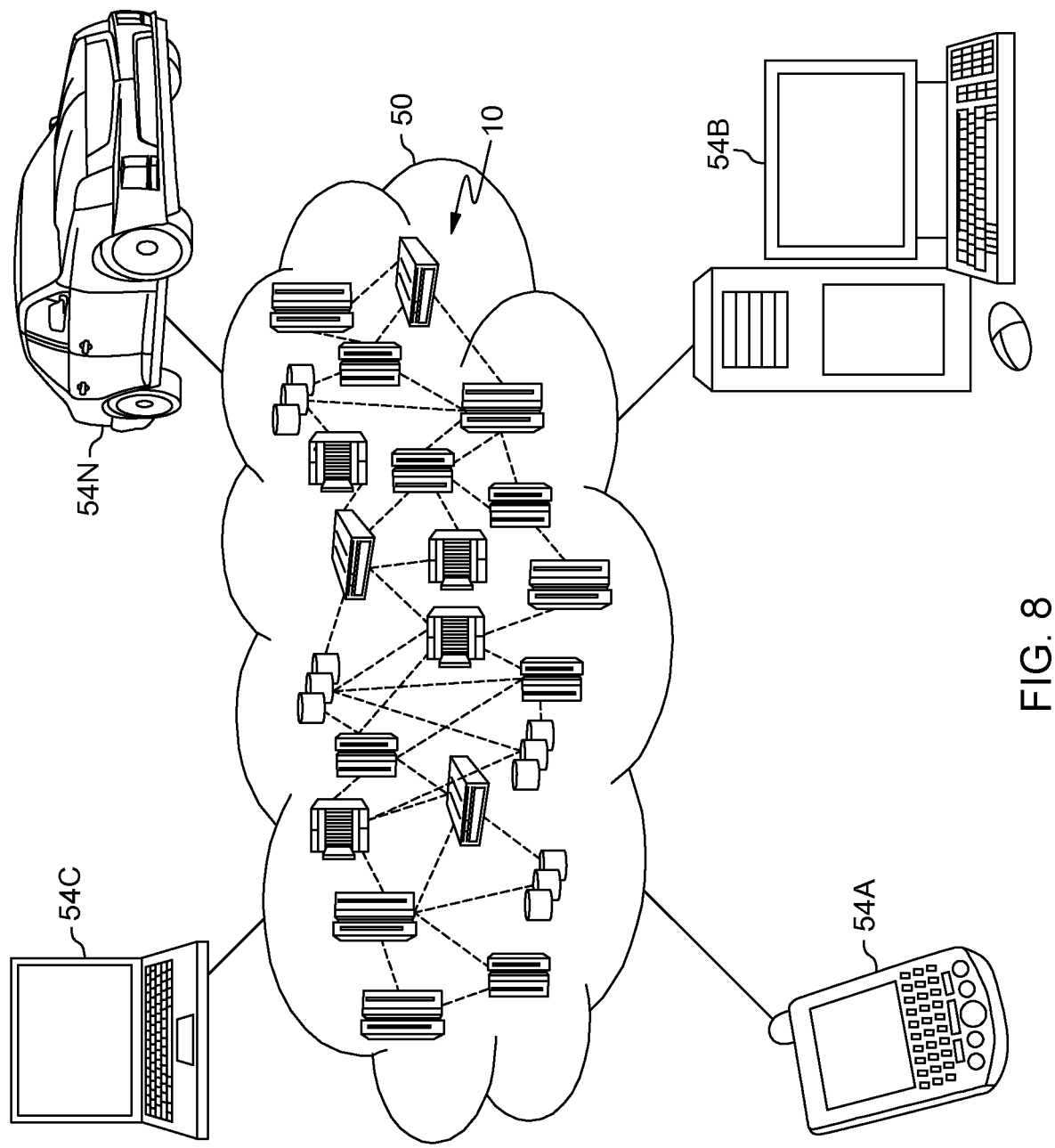
FIG. 8 is a block diagram depicting a cloud computing environment in accordance with at least one embodiment of the present invention.

FIG. 8 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
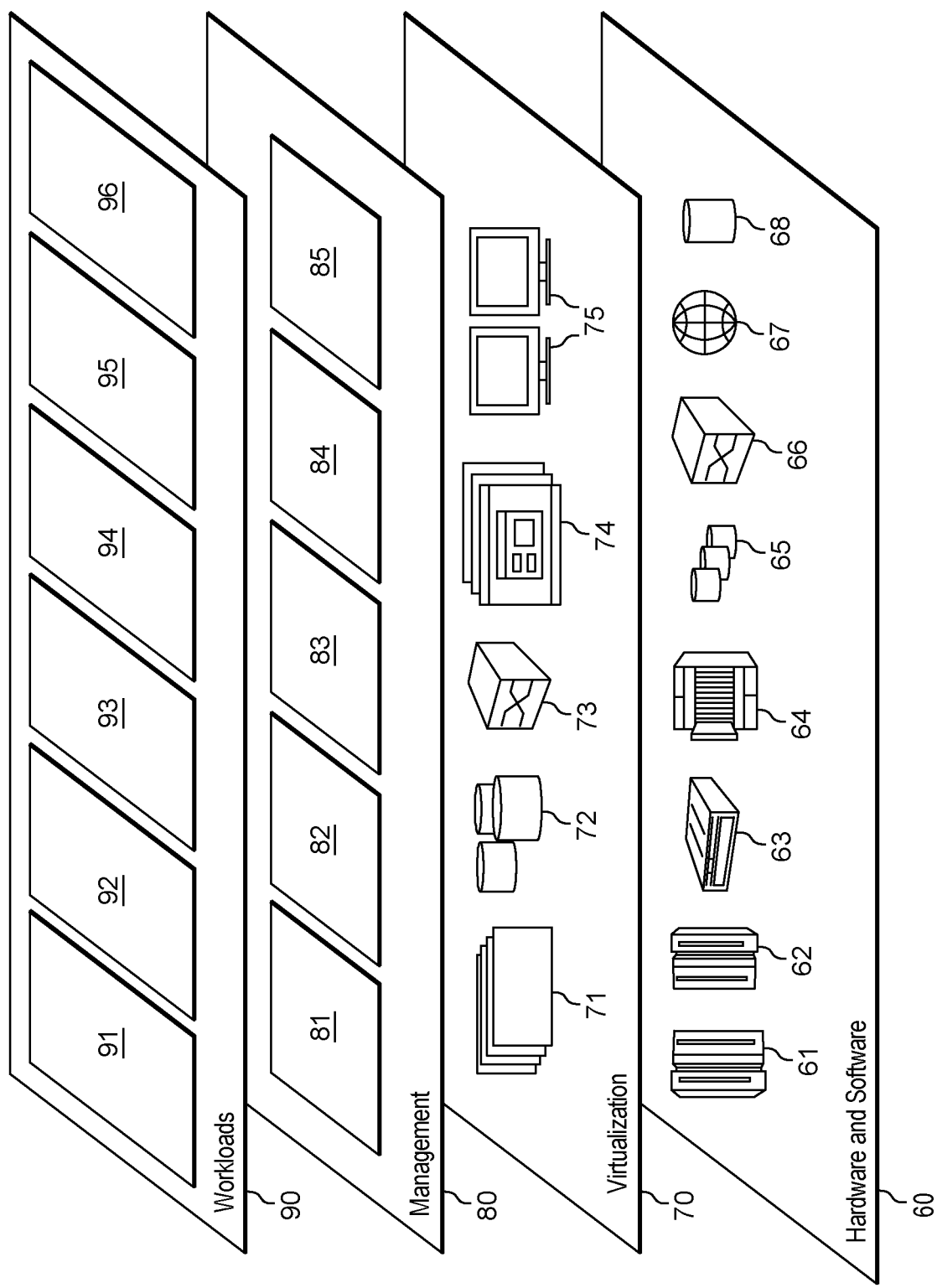
FIG. 9 is block diagram depicting abstraction model layers in accordance with at least one embodiment of the present invention.

FIG. 9 is block diagram depicting a set of functional abstraction model layers provided by cloud computing environment 50 depicted in FIG. 8 in accordance with at least one embodiment of the present invention. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic migration of conversations between communication platforms 96.

What is claimed is:

1. A computer-implemented method for dynamically migrating an email thread from an email platform to a message thread on a real-time messaging platform, comprising:
   migrating an email thread from the email platform to the real-time messaging platform in response to an attribute associated with the email thread reaching a predetermined threshold level, wherein:
      migrating the email thread includes converting contents of the email thread into one or more message threads on the real-time messaging platform;
   determining that a number of unanswered questions in the email thread migrated to the real-time messaging platform is below a predetermined threshold; and
   re-migrating the email thread from the real-time messaging platform to the email platform.

2. The computer-implemented method of claim 1, wherein the attribute is a number of different conversational topics included in the email thread.

3. The computer-implemented method of claim 2, wherein:
   a separate message thread is created for each conversational topic included in the email thread; and only a set of recipients of emails associated with a particular conversational topic are added to a respective message thread associated with the particular conversational topic.

4. The computer-implemented method of claim 1, further comprising:
identifying one or more email sub-threads in the email thread; and
creating a separate message thread for each email sub-thread.

5. The computer-implemented method of claim 1, wherein the attribute is a frequency of emails being added to the email thread.

6. The computer-implemented method of claim 1, wherein the attribute is a number of emails added to the email thread.

7. The computer-implemented method of claim 1, wherein the attribute is a number of different recipients included in the email thread.

8. The computer-implemented method of claim 1, wherein the attribute is an overall score associated with the email thread.

9. The computer-implemented method of claim 8, wherein the overall score associated with the email thread is incremented based, at least in part, on: (i) a total number of emails included in the email thread, (ii) a number of personal identifiers associated with recipients located in a body of emails in the email thread, (iii) a number of sentences contained in the email thread, (iv) a number of questions posed, and (v) a type of question posed.

10. The computer-implemented method of claim 9, wherein the overall score associated with the email thread is decremented based, at least in part, on each question-answer pair identified in the email thread.

11. The computer-implemented method of claim 1,
wherein re-migrating the email thread from the real-time messaging platform to the email platform is further responsive to:
monitoring the one or more message threads for additional questions for a predetermined period of time; and
determining that no additional questions are posed within the one or more message threads within the predetermined period of time.

12. The computer-implemented method of claim 1, wherein a user associated with an original email of the email chain thread is designated as an administrator of the email thread migrated to the real-time messaging platform.

13. A computer program product for dynamically migrating an email thread from an email platform to a message thread on a real-time messaging platform, the computer program product including one or more computer readable storage media and program instructions stored on the one or more computer readable storage media, the program instructions including instructions to:
migrate the email thread from the email platform to the real-time messaging platform in response to an attribute associated with the email thread reaching a predetermined threshold level, wherein:
the instructions to migrate the email thread includes instructions to convert contents of the email thread into one or more message threads on the real-time messaging platform;
determine that a number of unanswered questions in the email thread migrated to the real-time messaging platform is below a predetermined threshold; and
re-migrate the email thread from the real-time messaging platform to the email platform.

14. The computer program product of claim 13, wherein the attribute is an overall score associated with the email thread.

15. The computer program product of claim 14, wherein the overall score associated with the email thread is incremented based, at least in part, on: (i) a total number of emails included in the email thread, (ii) a number of personal identifiers associated with recipients located in a body of emails in the email thread, (iii) a number of sentences contained in the email thread, (iv) a number of questions posed, and (v) a type of question posed.

16. The computer program product of claim 15, wherein the overall score associated with the email thread is decremented based, at least in part, on each question-answer pair identified in the email thread.

17. The computer program product of claim 13, wherein the instructions to re-migrate the message thread from the real-time messaging platform to the email platform is further responsive to:
monitor the one or more message threads for additional questions for a predetermined period of time; and
determine that no additional questions are posed within the one or more message threads within the predetermined period of time.

18. A computer system for dynamically migrating an email thread from an email platform to a message thread on a real-time messaging platform, comprising:
one or more computer processors;
one or more computer readable storage media; and
computer program instructions, the computer program instructions being stored on the one or more computer readable storage media for execution by the one or more computer processors, and the computer program instructions including instructions to:
migrate the email thread from the email platform to the real-time messaging platform in response to an attribute associated with the email thread reaching a predetermined threshold level, wherein:
the instructions to migrate the email thread includes instructions to convert contents of the email thread into one or more message threads on the real-time messaging platform;
determine that a number of unanswered questions in the email thread migrated to the real-time messaging platform is below a predetermined threshold; and
re-migrate the email thread from the real-time messaging platform to the email platform.

\* \* \* \* \*